United States Patent
Noguchi et al.

(10) Patent No.: US 9,160,950 B2
(45) Date of Patent: Oct. 13, 2015

(54) IMAGE CAPTURING APPARATUS, IMAGE CAPTURING METHOD, IMAGE CAPTURING CIRCUIT, AND PROGRAM

(75) Inventors: Kazuhide Noguchi, Tokyo (JP); Takashi Sakashita, Tokyo (JP); Jun Yoshida, Tokyo (JP)

(73) Assignee: NEC TOSHIBA SPACE SYSTEMS, LTD., Tokyo (JP)

( * ) Notice: Subject to any disclaimer, the term of this patent is extended or adjusted under 35 U.S.C. 154(b) by 568 days.

(21) Appl. No.: 13/384,384

(22) PCT Filed: Jul. 20, 2010

(86) PCT No.: PCT/JP2010/062184
§ 371 (c)(1),
(2), (4) Date: Jan. 17, 2012

(87) PCT Pub. No.: WO2011/010641
PCT Pub. Date: Jan. 27, 2011

(65) Prior Publication Data
US 2012/0113257 A1 May 10, 2012

(30) Foreign Application Priority Data
Jul. 21, 2009 (JP) ................... P2009-169965

(51) Int. Cl.
*H04N 7/18* (2006.01)
*H04N 5/369* (2011.01)
(Continued)

(52) U.S. Cl.
CPC ............ *H04N 5/3692* (2013.01); *G01C 11/025* (2013.01); *H04N 5/3572* (2013.01); *H04N 5/37206* (2013.01)

(58) Field of Classification Search
CPC ............. G01C 11/025; H04N 5/37206; H04N 5/3692; H04N 5/3572

USPC .................................................. 348/144
See application file for complete search history.

(56) References Cited

U.S. PATENT DOCUMENTS 4,663,656 A * 5/1987 Elabd et al. ............ 348/316
4,951,136 A * 8/1990 Drescher et al. ........ 348/145
(Continued)

FOREIGN PATENT DOCUMENTS

| JP | 2000078482 A | 3/2000 |
| JP | 2005057552 A | 3/2005 |
| JP | 2008236156 A | 10/2008 |

OTHER PUBLICATIONS

International Search Report for PCT/JP2010/062184 mailed Aug. 17, 2010.

*Primary Examiner* — Jay Patel
*Assistant Examiner* — Francis G Geroleo
(74) *Attorney, Agent, or Firm* — Sughrue Mion, PLLC

(57) ABSTRACT

Provided is an image capturing apparatus for capturing an image of a target object by optically scanning the target object by moving in a predetermined scanning direction. The apparatus includes light-receiving devices that are arranged on a light-receiving surface of the image capturing apparatus in a direction perpendicular to the scanning direction, where each light-receiving device accumulates an electric charge according to an amount of light received from the target object; and an output device that outputs the electric charge accumulated by each light-receiving device regularly at a predetermined output period which is determined in a manner such that the larger the length in the scanning direction of a light-receiving range for the target object by the light-receiving device, the longer the output period.

8 Claims, 6 Drawing Sheets

(51) Int. Cl.
  *G01C 11/02* (2006.01)
  *H04N 5/357* (2011.01)
  *H04N 5/372* (2011.01)

(56) References Cited

U.S. PATENT DOCUMENTS

| | | | |
|---|---|---|---|
| 5,252,818 A * | 10/1993 | Gerlach et al. | 348/250 |
| 5,668,593 A * | 9/1997 | Lareau et al. | 348/146 |
| 5,765,044 A * | 6/1998 | Murai et al. | 348/145 |
| 5,999,211 A * | 12/1999 | Hedges et al. | 348/144 |
| 6,088,055 A * | 7/2000 | Lareau et al. | 348/113 |
| 6,108,032 A * | 8/2000 | Hoagland | 348/144 |
| 6,130,705 A * | 10/2000 | Lareau et al. | 348/144 |
| 6,658,207 B1 * | 12/2003 | Partynski et al. | 348/144 |
| 6,747,686 B1 * | 6/2004 | Bennett | 348/145 |
| 6,856,380 B2 * | 2/2005 | Wong et al. | 348/147 |
| 7,873,238 B2 * | 1/2011 | Schultz et al. | 382/284 |
| 7,991,226 B2 * | 8/2011 | Schultz et al. | 382/167 |
| 7,995,799 B2 * | 8/2011 | Schultz et al. | 348/143 |
| 8,610,776 B2 * | 12/2013 | Larroque et al. | 348/144 |
| 2002/0085094 A1 * | 7/2002 | Teuchert | 348/144 |
| 2002/0149674 A1 * | 10/2002 | Mathews et al. | 348/144 |
| 2003/0117672 A1 * | 6/2003 | Geisbuesch | 358/485 |
| 2010/0232638 A1 * | 9/2010 | Leprince et al. | 348/187 |
| 2010/0232728 A1 * | 9/2010 | Leprince et al. | 382/294 |

* cited by examiner

IMAGE CAPTURING APPARATUS, IMAGE CAPTURING METHOD, IMAGE CAPTURING CIRCUIT, AND PROGRAM

TECHNICAL FIELD

The present invention relates to an image capturing apparatus, a image capturing method, a image capturing circuit, and a program, so as to capture an image of a target object to be captured by optically scanning the target object when moving in a predetermined scanning direction.

This application claims priority to and the benefits of Japanese Patent Application No. 2009-169965 filed on Jul. 21, 2009, the disclosure of which is incorporated herein by reference.

BACKGROUND ART

In a conventional technique, when performing image capturing by scanning a target object in a specific scanning direction (e.g., satellite observation using the orbit of an artificial satellite), an optical detector called a line CCD (Charge Coupled Device) is used, in which a plurality of light-receiving elements, each corresponding to one pixel, are arranged in a direction perpendicular to the scanning direction (see, for example, Patent Document 1).

Hereinafter, an image capturing method of the conventional technique by an image capturing apparatus using the line CCD will be described using the drawings.

FIG. 5 is a diagram showing a known satellite observation method.

As shown in FIG. 5, an artificial satellite which moves in an AT (Along Track) direction, which is a traveling direction of the satellite and also a scanning direction. The artificial satellite includes an image capturing apparatus which has a line CCD in which light-receiving elements are arranged in a CT (Cross Track) direction perpendicular to the orbit of the satellite.

After the image capturing is started, the image capturing apparatus moves in the AT direction in accordance with the movement of the artificial satellite. The light-receiving elements of the line CCD in the image capturing apparatus receive light from each corresponding image capturing range (i.e., light-receiving range from the target object by the light-receiving elements) and accumulate (electric) charge which is obtained by photoelectric conversion and corresponds to the amount of received light.

When the line CCD completes the scanning of an image capturing range corresponding to one pixel in the AT direction, the light-receiving elements each output the accumulated charge, and start light reception from the next image capturing range. Accordingly, the line CCD sequentially outputs electric charge corresponding to the amount of light from the image capturing range in the CT direction, where each image capturing range corresponds to one pixel in the AT direction.

If the output charge is converted into image information for the CT direction, and the sequentially-obtained image information is aligned in order of the image capturing time, then the image of the target object is obtained.

PRIOR ART DOCUMENT

Patent Document

Patent Document 1: Japanese Unexamined Patent Application, First Publication No. 2000-078482.

DISCLOSURE OF INVENTION

Problem to be Solved by the Invention

However, in the conventional technique, the entire CCD in the line direction is driven by the same line rate (i.e., the same clock output frequency) so as to cover the entire visual field. Therefore, the larger the angle between the light-receiving direction of each light-receiving element and the vertical direction (with respect to the ground surface), the larger the image capturing range (GSD: Ground Sample Distance) corresponding to one pixel of the light-receiving element. Such an increased image capturing range degrades the sharpness of the relevant image.

Below, the above problem will be explained in detail.

FIG. 6 is a diagram showing a variation in the light-receiving range of each light-receiving element.

As shown in FIG. 6, the larger the angle between the vertical direction and the light-receiving direction of each light-receiving element, the larger the distance between the light-receiving element and the light-receiving range assigned thereto.

In addition, each light-receiving element has an angle of view. Therefore, the larger the angle between the vertical direction and the light-receiving direction of each light-receiving element, the larger the image capturing range corresponding to one pixel of the light-receiving element and also the longer the image capturing range in the AT direction.

Therefore, when the entire CCD in the line direction is driven by the same line rate, the farther the light-receiving direction of each light-receiving element from the vertical direction, the larger the amount of light received from an area (i.e., noise area) other than the target area corresponding to one pixel (see FIG. 6).

In other words, the larger the angle between the vertical direction and the light-receiving direction of each light-receiving element, the higher the ratio of light as noise to the total amount of received light. Such increased noisy light degrades the sharpness of the image in the AT direction.

The present invention has been made in view of the above circumstances, and an object of the invention is to provide an image capturing apparatus, an image capturing method, an image capturing circuit, and a program, by which when performing image capturing by scanning a target object in a specific scanning direction, a variation in the sharpness of the image due to different light-receiving directions of light-receiving elements is reduced.

Means for Solving the Problem

The present invention has been made to solve the above problems, and provides an image capturing apparatus for capturing an image of a target object by optically scanning the target object by moving in a predetermined scanning direction, the apparatus comprising:

light-receiving devices that are arranged on a light-receiving surface of the image capturing apparatus in a direction perpendicular to the scanning direction, where each light-receiving device accumulates an electric charge according to an amount of light received from the target object; and an output device that outputs the electric charge accumulated by each light-receiving device regularly at a predetermined output period which is determined based on the length in the scanning direction of a light-receiving range for the target object by the light-receiving device.

The present invention also provides an image capturing method using an image capturing apparatus that captures an image of a target object by optically scanning the target object by moving in a predetermined scanning direction, the method comprising:

accumulating, by each of light-receiving devices arranged on a light-receiving surface of the image capturing apparatus in a direction perpendicular to the scanning direction, an electric charge according to an amount of light received from the target object; and outputting, by an output device, the electric charge accumulated by each light-receiving device regularly at a predetermined output period which is determined based on the length in the scanning direction of a light-receiving range for the target object by the light-receiving device.

The present invention also provides an image capturing circuit for capturing an image of a target object by optically scanning the target object by moving in a predetermined scanning direction, the apparatus comprising:

light-receiving circuits that are arranged on a light-receiving surface of the image capturing apparatus in a direction perpendicular to the scanning direction, where each light-receiving circuit accumulates an electric charge according to an amount of light received from the target object; and an output circuit that outputs the electric charge accumulated by each light-receiving circuit regularly at a predetermined output period which is determined based on the length in the scanning direction of a light-receiving range for the target object by the light-receiving circuit.

The present invention also provides a program that makes a computer, which is built in an image capturing apparatus, function as an output device, wherein:

the image capturing apparatus optically scans a target object by moving in a predetermined scanning direction, and has light-receiving devices arranged on a light-receiving surface in a direction perpendicular to the scanning direction, where each light-receiving device accumulates an electric charge according to an amount of light received from the target object; and the output device outputs the electric charge accumulated by each light-receiving device regularly at a predetermined output period which is determined based on the length in the scanning direction of a light-receiving range for the target object by the light-receiving device.

Effect of the Invention

According to the present invention, the output device outputs the electric charge accumulated by each light-receiving device regularly at a predetermined output period which is determined based on the length in the scanning direction of a light-receiving range for the target object by the light-receiving device. That is, electric charge output is performed based on an individual output period determined in accordance with the light-receiving direction of each light-receiving device. Therefore, the degree of sharpness for image quality can be determined for each light-receiving device, and thus it is possible to reduce a variation in the sharpness of the image due to different light-receiving directions.

MODE FOR CARRYING OUT THE INVENTION

Below, an embodiment of the present invention will be explained in detail with reference to the drawings.

Figure 1:
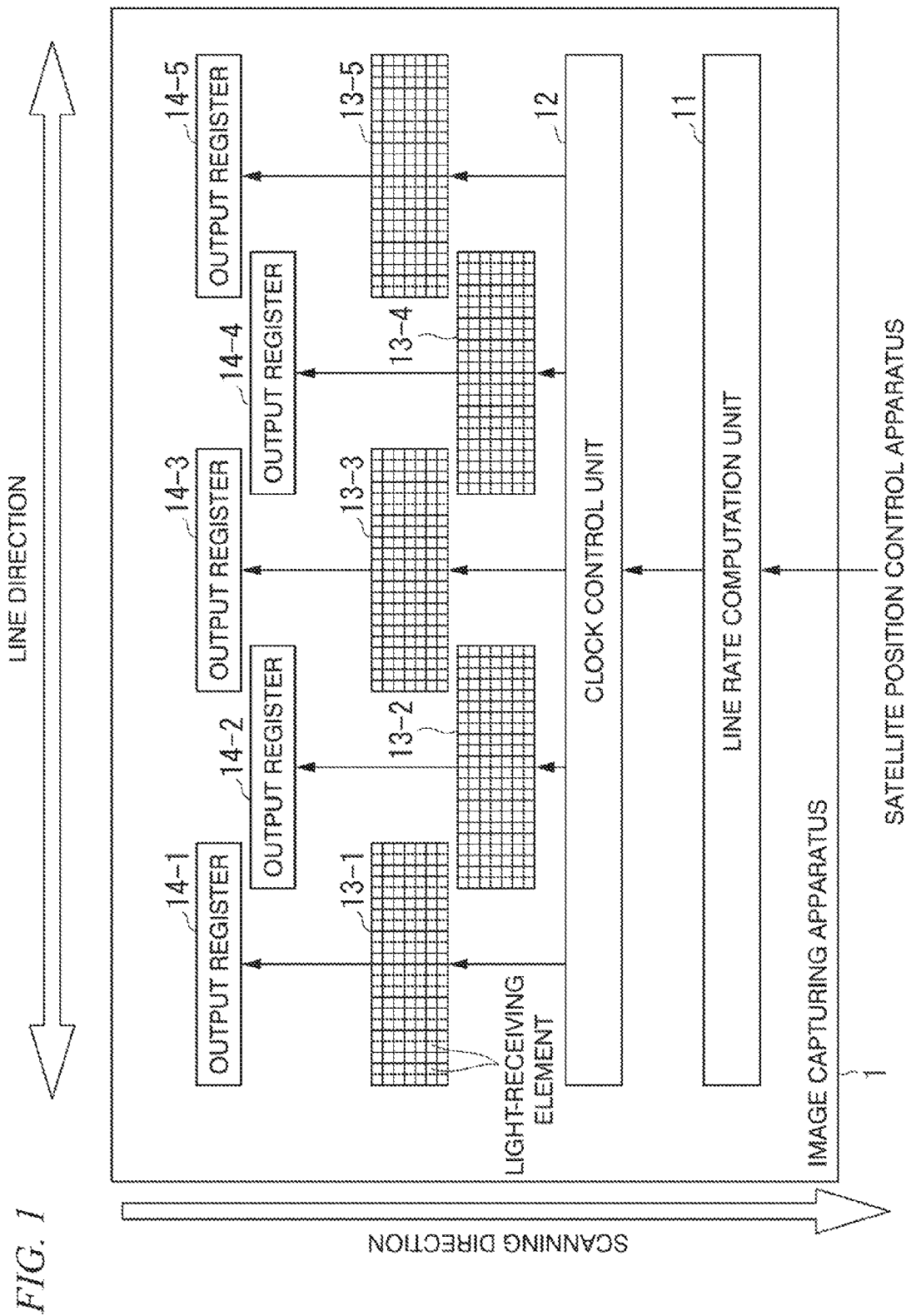
FIG. 1 is a general block diagram showing the structure of an image capturing apparatus as an embodiment of the present invention.

FIG. 1 is a general block diagram showing the structure of an image capturing apparatus as an embodiment of the present invention.

An image capturing apparatus 1 has a line rate computation unit 11, a clock control unit 12 (i.e., output device), a linear TDI-CCDs (Time Delay Integration Charge Coupled Devices) 13-1 to 13-5 (i.e., light-receiving devices), and output registers 14-1 to 14-5.

In the present embodiment, the image capturing apparatus 1 is installed in an GPS satellites (flying body), and the earth is a target object to be captured.

The line rate computation unit 11 computes a line rate (corresponding to the output frequency) of a charge transfer clock signal for controlling each of the linear TDI-CCDs 13-1 to 13-5.

The clock control unit 12 outputs the charge transfer clock signal at the line rate (computed by the line rate computation unit 11) to each of the linear TDI-CCDs 13-1 to 13-5.

The linear TDI-CCDs 13-1 to 13-5 are one-dimensional sensors, each having light-receiving elements in the AT and CT directions.

Each of the light-receiving elements in the linear TDI-CCDs 13-1 to 13-5 accumulates (electric) charge in accordance with the amount of light received from the target object, and transfers, by the relevant charge transfer clock signal output from the clock control unit 12, the accumulated charge to an adjacent light-receiving element positioned opposite the scanning direction.

Additionally, in linear TDI-CCDs 13-1 to 13-5, the last light-receiving elements positioned in the reverse of the scanning direction transfer the relevant charge to the corresponding output registers 14-1 to 14-5 by means of the charge transfer clock signals. That is, the linear TDI-CCDs 13-1 to 13-5 perform transfer and synthesis of electric charge by using temporal delay.

The output registers 14-1 to 14-5 store the charge output from the linear TDI-CCDs 13-1 to 13-5.

The linear TDI-CCDs 13-1 to 13-5 arranged in the CT direction on the light-receiving surface of the image capturing apparatus 1 accumulate electric charge in accordance with the amount of light received from the target object, and the clock control unit 12 makes the linear TDI-CCDs 13-1 to 13-5 output the accumulated charge periodically according to a specific output period, which is determined in a manner such that the larger the length of light-receiving range (by the linear TDI-CCDs 13-1 to 13-5) on the target object in the scanning direction, the longer the specific output period.

According to the above structure, it is possible to reduce variations in the sharpness of the image, due to a difference between the light-receiving directions of the linear TDI-CCDs 13-1 to 13-5.

Below, the operation of the image capturing apparatus 1 will be explained.

Before starting the image capturing, the line rate computation unit 11 obtains information about height, speed, and position of an artificial satellite in which the image capturing apparatus 1 is built, from a satellite position control apparatus of the artificial satellite.

The line rate computation unit 11 then computes a ground speed (scanning speed) of the artificial satellite, where the ground speed equals to a moving speed of a map, which is obtained by projecting the artificial satellite onto the ground surface and moves on the ground surface in accordance with the travel of the artificial satellite.

Figure 2:
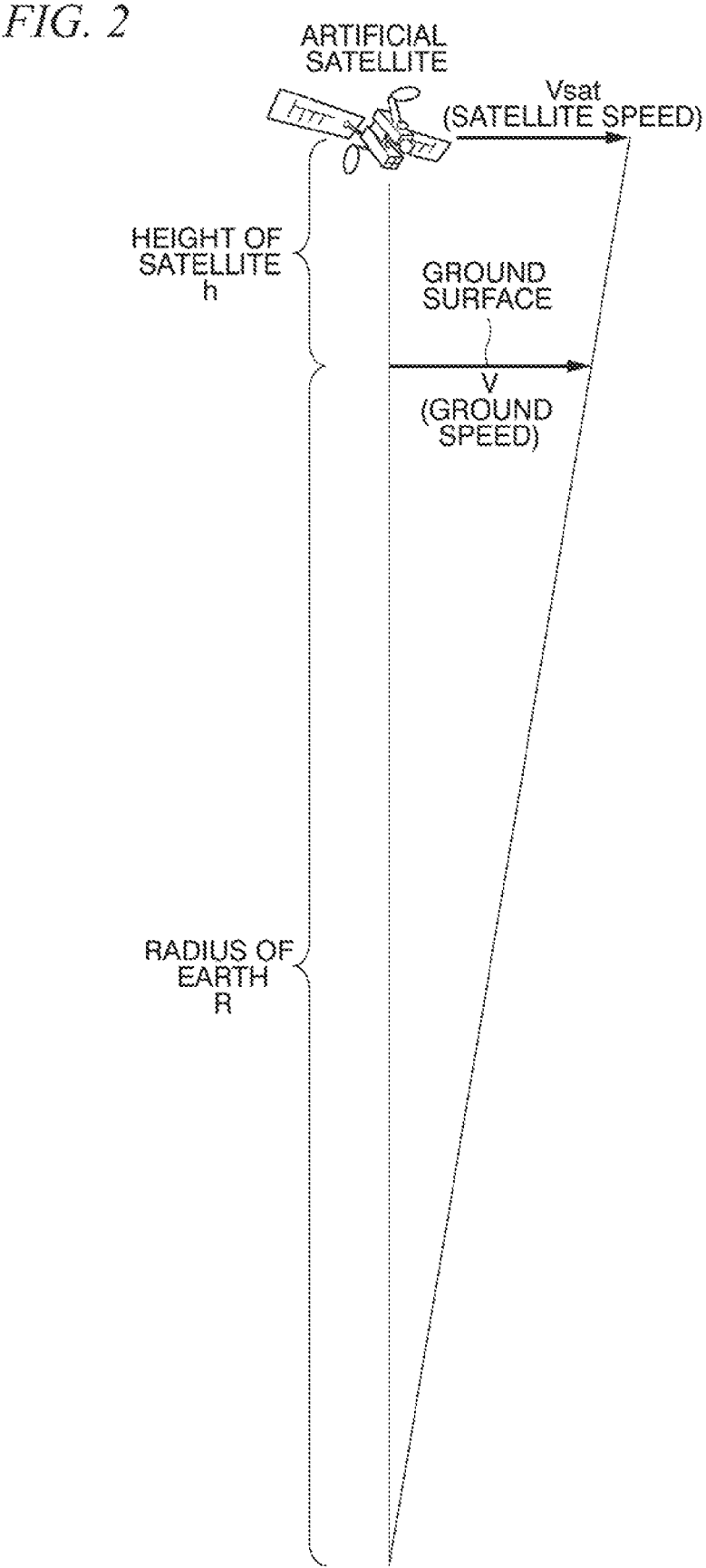
FIG. 2 is a diagram showing a positional relationship between the earth and an artificial satellite.

FIG. 2 is a diagram showing a positional relationship between the earth and an artificial satellite.

Since the equation of motion of the artificial satellite is defined by Formula (1), satellite speed $V_{sat}$ is obtained by Formula (2), and ground speed V is obtained by Formula (3).

[Formula 1]

$$m\frac{V_{sat}^2}{R+h} = G\frac{Mm}{(R+h)^2} \quad (1)$$

[Formula 2]

$$V_{sat} = \sqrt{\frac{GM}{R+h}} \quad (2)$$

[Formula 3]

$$V = V_{sat}\frac{R}{R+h} \quad (3)$$

In the above formulas, m denotes the mass of the artificial satellite, R denotes the radius of the earth, h denotes the height of the artificial satellite (called "satellite height") from the ground surface, G denotes the universal constant of gravitation, and M denotes the mass of the earth.

After computing the ground speed of the artificial satellite, the line rate computation unit 11 computes a line rate assigned to each of the linear TDI-CCDs 13-1 to 13-5.

If a light-receiving direction of the linear TDI-CCDs 13-1 to 13-5 is substantially identical to the vertical direction from the artificial satellite (i.e., direction of orthogonal projection onto the target object), the line rate computation unit 11 computes a line rate at which the travel distance on the ground surface of the artificial satellite coincides with the length in the AT direction of a predetermined area assigned to one pixel for light reception.

Therefore, line rate f for the linear TDI-CCDs 13-1 to 13-5 at which the relevant light-receiving direction is substantially identical to the vertical direction from the artificial satellite is obtained by Formula (4).

[Formula 4]

$$f = \frac{V}{D} \quad (4)$$

In the above formula, D denotes the length in the AT direction of the area corresponding to one pixel for light reception.

Figure 3:
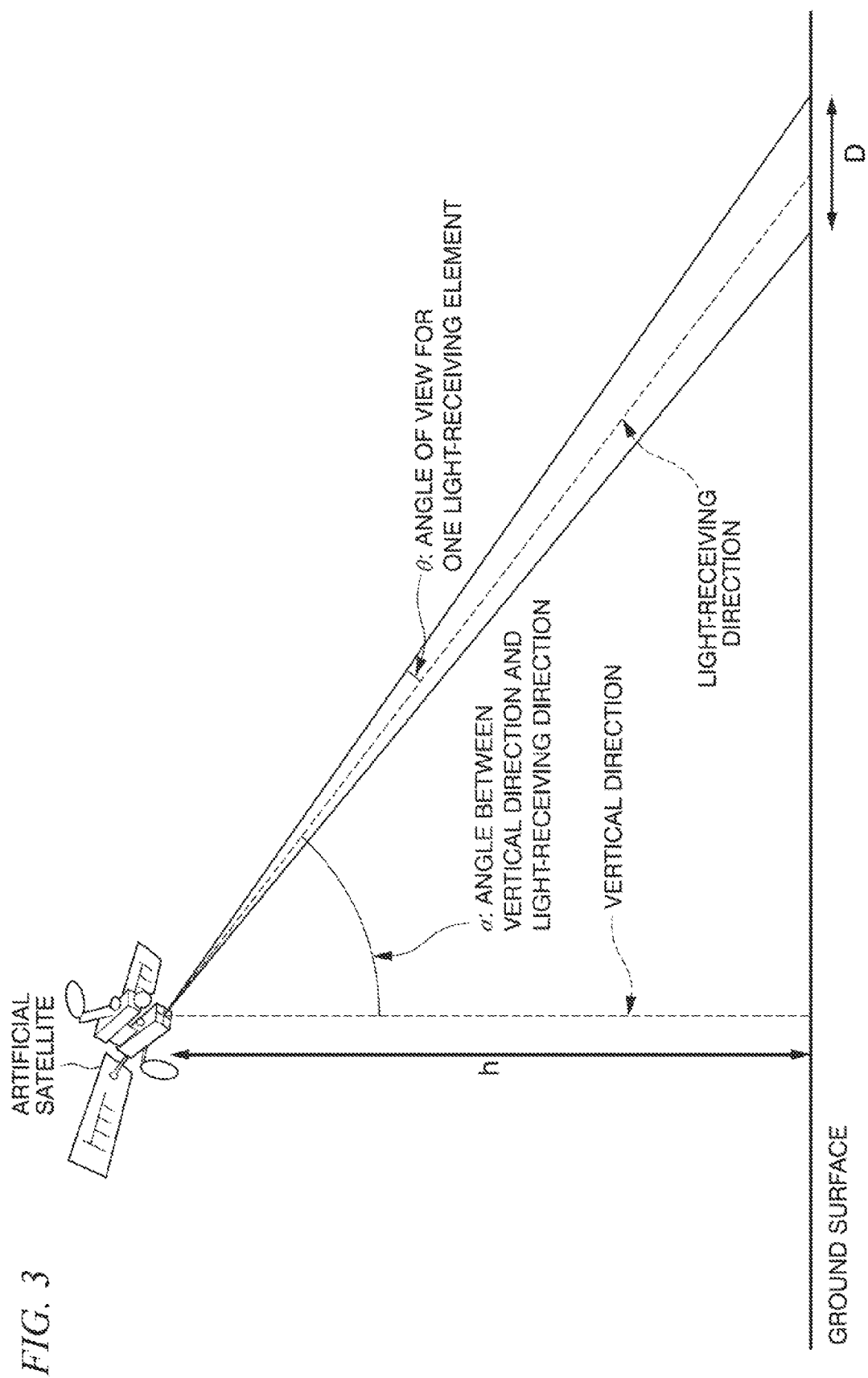
FIG. 3 is a diagram showing the length of a light-receiving range on the ground surface when the light-receiving direction differs from the vertical direction for the artificial satellite.

FIG. 3 is a diagram showing the length of a light-receiving range on the ground surface when the light-receiving direction differs from the vertical direction for the artificial satellite.

When a light-receiving direction of the linear TDI-CCDs 13-1 to 13-5 differs from the vertical direction for the artificial satellite, the length in the AT direction of the light-receiving range (for the linear TDI-CCDs 13-1 to 13-5) on the ground surface is larger than that measured when the light-receiving direction equals to the vertical direction for the artificial satellite.

Therefore, line rate f for the linear TDI-CCDs 13-1 to 13-5 when the relevant light-receiving direction differs from the vertical direction for the artificial satellite is obtained by Formula (5).

[Formula 5]

$$f = \frac{V}{h\{\tan(\theta + \alpha) - \tan\alpha\}} \quad (5)$$

In the above formula, α denotes the angle between a light-receiving direction of the linear TDI-CCDs 13-1 to 13-5 and the vertical direction for the artificial satellite, and θ denotes the angle of view of one light-receiving element in the linear TDI-CCDs 13-1 to 13-5. That is, the denominator of Formula (5) corresponds to D in the above Formula (4), and indicates the length in the AT direction corresponding to one pixel for light reception when the light-receiving direction differs from the vertical direction for the artificial satellite.

Accordingly, the larger the length in the AT direction of the light-receiving range for the linear TDI-CCDs 13-1 to 13-5, the smaller the computed line rate. In other words, the larger the length in the scanning direction of the light-receiving range for the linear TDI-CCDs 13-1 to 13-5, the longer the period at which the linear TDI-CCDs 13-1 to 13-5 each output the charge to the corresponding output register.

Therefore, in the linear TDI-CCDs 13-1 to 13-5, the larger the length in the AT direction of the light-receiving range, the larger the length of the area assigned to one pixel for light reception.

Accordingly, the line rate computation unit 11 computes the lie rate for each of the linear TDI-CCDs 13-1 to 13-5 by using Formula (4) or (5). The line rate is fixed for each of the linear TDI-CCDs 13-1 to 13-5, where a line rate most suitable for the center light-receiving element in each of the linear TDI-CCDs 13-1 to 13-5 is determined to be a line rate assigned to the corresponding one of the linear TDI-CCDs 13-1 to 13-5, which includes the relevant light-receiving element.

After the line rate computation unit 11 computes the line rate of each of the linear TDI-CCDs 13-1 to 13-5, the image capturing apparatus 1 starts image capturing. That is, the clock control unit 12 outputs a charge transfer clock signal to each of the linear TDI-CCDs 13-1 to 13-5, where the signal operates by the line rate computed by the line rate computation unit 11.

Accordingly, each light-receiving element in the linear TDI-CCDs 13-1 to 13-5 accumulates electric charge in accordance with the amount of light received from the target object, and transfers the accumulated charge to an adjacent light-receiving element arranged in the reverse of the scanning direction, based on the relevant charge transfer clock signal output from the clock control unit 12.

Additionally, in linear TDI-CCDs 13-1 to 13-5, the last light-receiving elements positioned in the reverse of the scanning direction transfer the relevant charge to the corresponding output registers 14-1 to 14-5 by means of the relevant charge transfer clock signals.

Accordingly, for each light-receiving element in the linear TDI-CCDs 13-1 to 13-5, the larger the light-receiving range on the ground surface, the later the timing of the charge transfer and thus the larger the area corresponding to one pixel for light reception. Therefore, the ratio of noisy light to the total amount of light is reduced, thereby preventing the sharpness of the image in the AT direction from being degraded.

Figure 4:
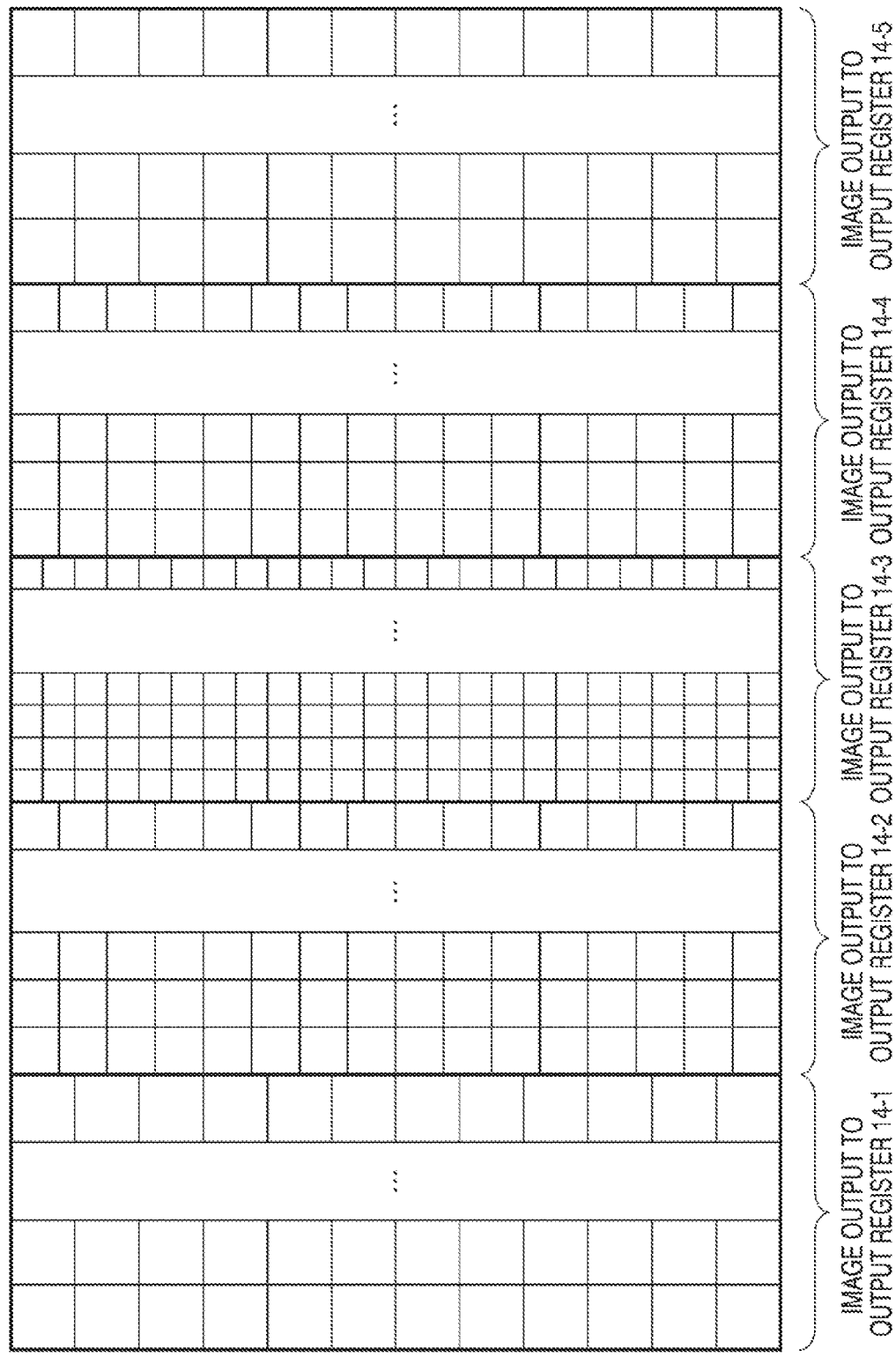
FIG. 4 is a diagram showing an example of synthesizing output images obtained by different line rates.
Figure 5:
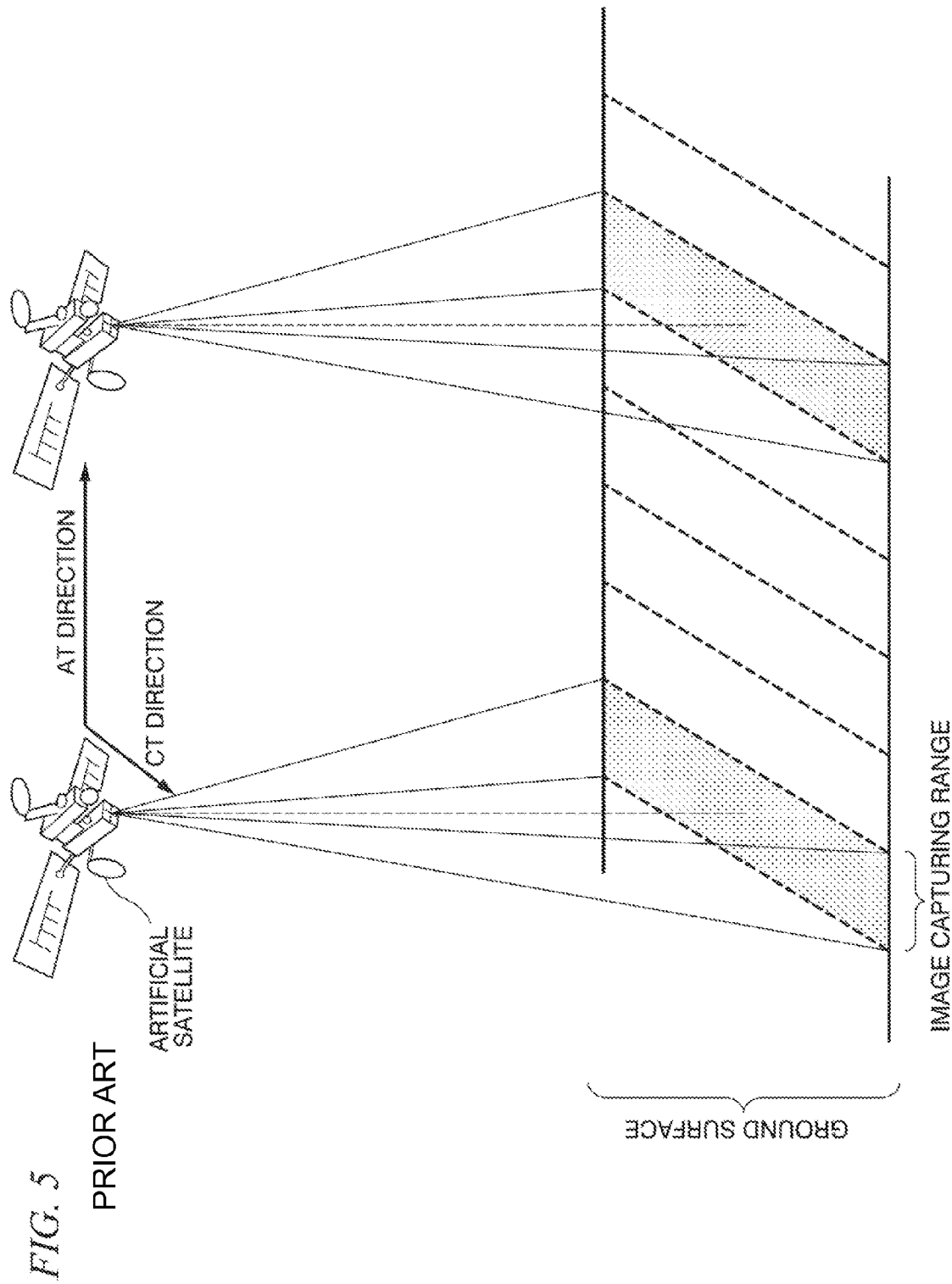
FIG. 5 is a diagram showing a known satellite observation method.
Figure 6:
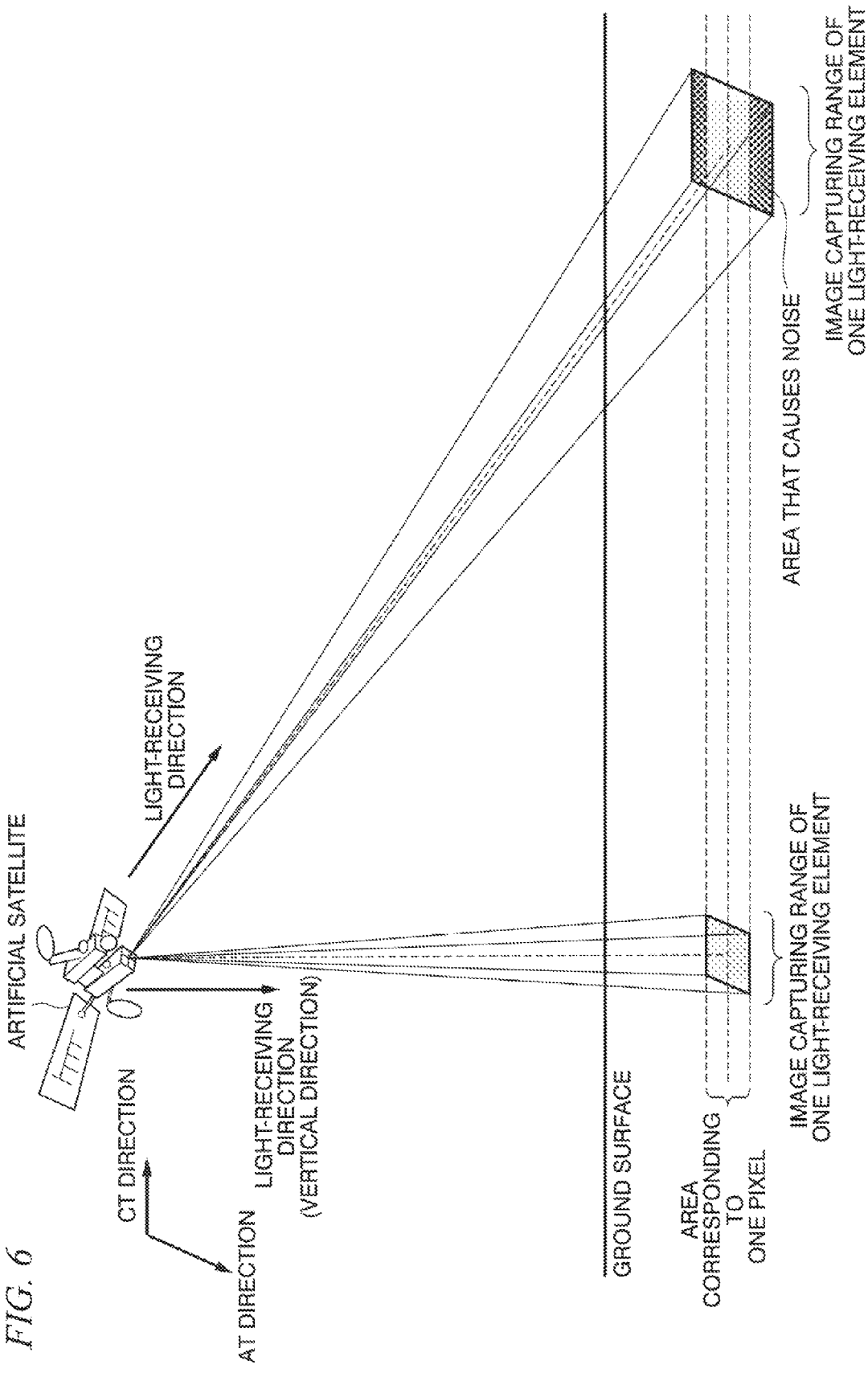
FIG. 6 is a diagram showing a variation in the light-receiving range of each light-receiving element.

FIG. 4 is a diagram showing an example of synthesizing output images obtained by different line rates.

Since the linear TDI-CCDs 13-1 to 13-5 are operated by the charge transfer clock signals having different frequencies as described above, the linear TDI-CCDs 13-1 to 13-5 output to the corresponding output registers 14-1 to 14-5, images having different numbers of samples. Similarly, the linear TDI-CCDs 13-1 to 13-5 have respective ranges for the area assigned to one pixel for light reception.

Therefore, as shown in FIG. 4, in the images output to the output registers 14-1 to 14-5, the length of each pixel is set to a value obtained by multiplying a predetermined length by the inverse (number) of the corresponding line rate, so that the output images can have the same length in the AT direction and can be synthesized.

Referring to FIG. 1, the image capturing ranges of the linear TDI-CCDs 13-1 to 13-5 have overlapped areas in the line direction. In this case, the images output to the output registers 14-1 to 14-5 include partially-overlapped pixel parts, which provides easy synthesis of the images output to the output registers 14-1 to 14-5 into one image.

As described above, in accordance with the present embodiment, the clock control unit 12 outputs a charge transfer clock signal at each output period determined based on the length in the scanning direction of the light-receiving range on the target object, for each of the linear TDI-CCDs 13-1 to 13-5, that is, performs charge output based on the individual output period depending on each light-receiving direction for the linear TDI-CCDs 13-1 to 13-5.

Accordingly, it is possible to determine the degree of sharpness for image quality, for each of the linear TDI-CCDs 13-1 to 13-5, thereby reducing variation in the sharpness of the image due to the different light-receiving directions.

An embodiment of the present invention has been described above in detail with reference to the drawings, but a specific configuration is not limited thereto and various design changes and the like may be made without departing from the scope of the present invention.

For example, although the image capturing apparatus 1 is installed in an artificial satellite in the present embodiment, the present invention is not limited thereto. Similar effects can be obtained when the image capturing apparatus 1 is installed, for example, in another flying object such as an airplane or balloon.

Additionally, although five linear TDI-CCDs are provided in the present embodiment, the present invention is not limited thereto and a configuration having two or more linear TDI-CCDs may be employed.

Here, employing a larger number of linear TDI-CCDs so as to reduce the number of light-receiving elements in the CT direction of each linear TDI-CCD, even a light-receiving element positioned at an end of each linear TDI-CCD in the CT direction can be driven by a line rate close to the optimum line rate for the light-receiving element, thereby further reducing the variation in the sharpness of the image.

In addition, although the linear TDI-CCDs 13-1 to 13-5 are used as light-receiving devices in the present embodiment, the present invention is not limited thereto and other one-dimensional sensors such as line CCDs which do not perform TDI operation may be used as the light-receiving devices.

Additionally, although the line rate computation unit 11 obtains height information from a satellite position control apparatus in the present embodiment, the present invention is not limited thereto. If the artificial satellite travels along an orbit having a fixed height (e.g., sun synchronous orbit), a line rate for a predetermined height may be computed in advance, which can omit the on-board computation (during the travel) by the line rate computation unit 11.

The above-described image capturing apparatus includes a computer system. The operation of the line rate computation unit 11 is stored as a program in a computer-readable storage medium, and the operation is performed when the relevant computer loads and executes the program.

The above computer readable storage medium is a magnetic disk, magneto optical disk, CD-ROM, DVD-ROM, semiconductor memory, or the like.

In addition, the relevant computer program may be provided to a computer via a communication line, and the computer which received the program may execute the program.

In addition, the program may execute a part of the above-explained functions, or may be a program (so-called "differential program") by which the above-described functions can be executed by a combination of this program and an existing program which has already been stored in the relevant computer system.

INDUSTRIAL APPLICABILITY

According to the present invention, electric charge is output based on different output periods associated with respective light-receiving directions of light-receiving devices. Therefore, the degree of sharpness for image quality can be determined for each light-receiving device, and thus it is possible to reduce a variation in the sharpness of the image due to different light-receiving directions.

REFERENCE SYMBOLS

1: image capturing apparatus
11: line rate computation unit
12: clock control unit
13-1 to 13-5: linear TDI-CCD
14-1 to 14-5: output register

The invention claimed is:
1. An image capturing apparatus for capturing an image of a target object by optically scanning the target object by moving in a predetermined scanning direction, the apparatus comprising:
light-receiving devices that are arranged on a light-receiving surface of the image capturing apparatus in a direction perpendicular to the scanning direction, where each light-receiving device has a plurality of light-receiving elements in the direction perpendicular to the scanning direction and accumulates an electric charge according to an amount of light received from the target object; and
an output device that outputs the electric charge accumulated by each light-receiving device regularly at a predetermined output period which is determined in a manner such that the larger the length in the scanning direction of a light-receiving range for the target object, which is covered by the light-receiving device, the longer the output period, wherein:
the length in the scanning direction of the light-receiving range for the target object is represented by:

$$D=h\{\tan(\theta+\alpha)-\tan\alpha\} \quad \text{[Formula 6]}$$

where h denotes a distance obtained by orthogonal projection of each light-receiving device onto the target object, θ denotes an angle of view of the light-receiving device in the scanning direction, and α denotes an angle between a direction of the orthogonal projection of the light-receiving device onto the target object and a light-receiving direction of the light-receiving device.

2. The image capturing apparatus according to claim 1, wherein:
the output period has a value obtained by dividing the length in the scanning direction of the light-receiving range for the target object by a scanning speed.

3. The image capturing apparatus according to claim 1, wherein:
each light-receiving device is a one-dimensional sensor having the light-receiving elements arranged in the direction perpendicular to the scanning direction.

4. The image capturing apparatus according to claim 1, wherein:
each light-receiving device also has light-receiving elements arranged in the scanning direction and performs transfer and synthesis of the electric charge by using temporal delay.

5. The image capturing apparatus according to claim 1, wherein:
the image capturing apparatus is mounted on a flying object and the scanning direction is a traveling direction of the flying object.

6. The image capturing apparatus according to claim 1, wherein:
each light-receiving device has an individually set line rate for charge transfer and the light-receiving elements of each light-receiving device have the same line rate.

7. An image capturing method using an image capturing apparatus that captures an image of a target object by optically scanning the target object by moving in a predetermined scanning direction, the method comprising:
accumulating, by each of light-receiving devices arranged on a light-receiving surface of the image capturing apparatus in a direction perpendicular to the scanning direction, an electric charge according to an amount of light received from the target object, where each light-receiving device has a plurality of light-receiving elements in the direction perpendicular to the scanning direction; and
outputting, by an output device, the electric charge accumulated by each light-receiving device regularly at a predetermined output period which is determined in a manner such that the larger the length in the scanning direction of a light-receiving range for the target object, which is covered by the light-receiving device, the longer the output period, wherein:
the length in the scanning direction of the light-receiving range for the target object is represented by:

$$D=h\{\tan(\theta+\alpha)-\tan\alpha\} \quad \text{[Formula 6]}$$

where h denotes a distance obtained by orthogonal projection of each light-receiving device onto the target object, θ denotes an angle of view of the light-receiving device in the scanning direction, and α denotes an angle between a direction of the orthogonal projection of the light-receiving device onto the target object and a light-receiving direction of the light-receiving device.

8. An image capturing circuit for capturing an image of a target object by optically scanning the target object by moving in a predetermined scanning direction, the apparatus comprising:
light-receiving circuits that are arranged on a light-receiving surface of the image capturing apparatus in a direction perpendicular to the scanning direction, where each light-receiving circuit has a plurality of light-receiving elements in the direction perpendicular to the scanning direction and accumulates an electric charge according to an amount of light received from the target object; and
an output circuit that outputs the electric charge accumulated by each light-receiving circuit regularly at a predetermined output period which is determined in a manner such that the larger the length in the scanning direction of a light-receiving range for the target object, which is covered by the light-receiving circuit, the longer the output period, wherein:
the length in the scanning direction of the light-receiving range for the target object is represented by:

$$D=h\{\tan(\theta+\alpha)-\tan\alpha\} \quad \text{[Formula 6]}$$

where h denotes a distance obtained by orthogonal projection of each light-receiving circuit onto the target object, θ denotes an angle of view of the light-receiving circuit in the scanning direction, and α denotes an angle between a direction of the orthogonal projection of the light-receiving circuit onto the target object and a light-receiving direction of the light-receiving circuit.

* * * * *